E. A. TRAVER.
ARTIFICIAL MINNOW.
APPLICATION FILED FEB. 27, 1922.

1,437,694.

Patented Dec. 5, 1922.

INVENTOR
Ernest A Traver
BY
Adam E Fisher
ATTORNEY

Patented Dec. 5, 1922.

1,437,694

UNITED STATES PATENT OFFICE.

ERNEST A. TRAVER, OF THORNTON, CALIFORNIA.

ARTIFICIAL MINNOW.

Application filed February 27, 1922. Serial No. 539,397.

*To all whom it may concern:*

Be it known that I, ERNEST A. TRAVER, a citizen of the United States, residing in the city of Thornton and State of California, have invented new and useful Improvements in Artificial Minnows, of which the following is a specification. reference being had to the accompanying drawings:

This invention is an artificial minnow for use in catching fish.

The object is to provide a simple and efficient artificial minnow or bait having hooks adapted to be retracted within the shell body of the bait so as to evade weeds and the like, and embodying means for springing the hooks outwardly into the mouth of the fish when the latter attempts to swallow the bait.

Figure 1:
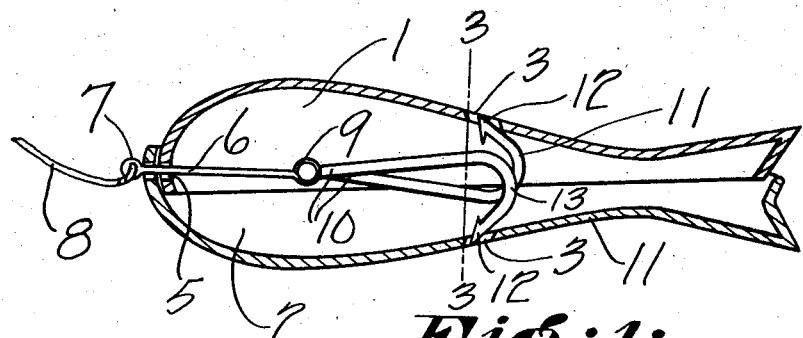
Figure 1 is a longitudinal section showing the hooks retracted.
Figure 2:
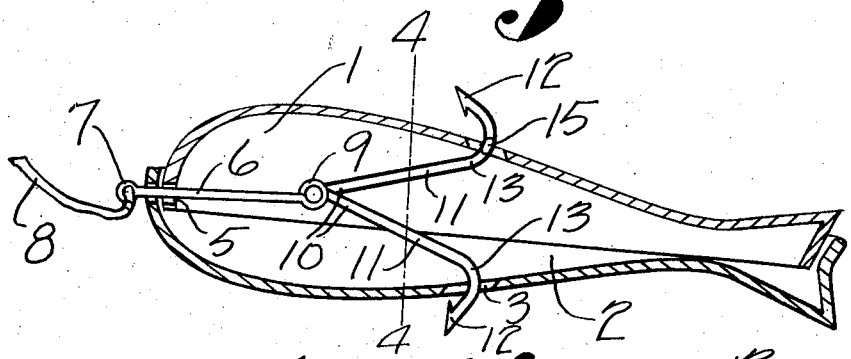
Figure 2 is a similar view showing the hooks sprung outward.
Figure 3:
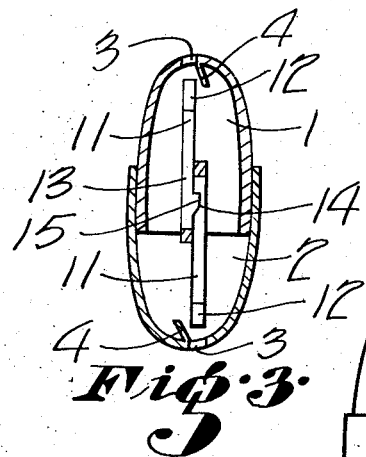
Figure 3 is a cross section on the line 3—3 in Figure 1.
Figure 4:
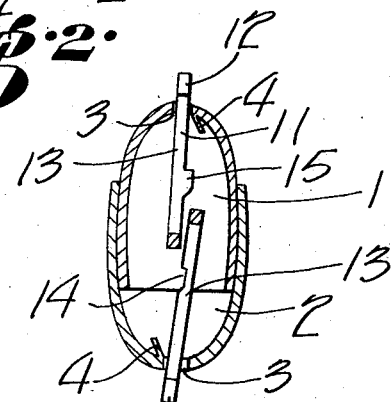
Figure 4 is a cross section on the line 4—4 in Figure 2.
Figure 5:
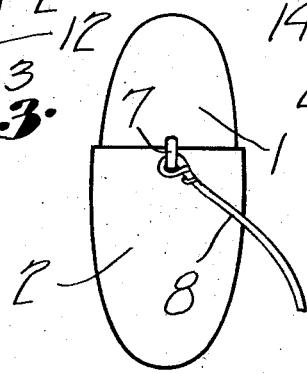
Figure 5 is a front view.

The invention consists of two half shells 1 and 2, representing a minnow or similar bait when placed together, and one of the shells, as 1, being less in width than the other, as 2, so as to slidingly pass within that half shell, 2, thus collapsing the bait to some extent. The shells 1 and 2 are pierced medially with hook ports 3, and an inclined slide 4 is arranged interiorly and at one side of each of said ports 3, the said slides being directed inwardly and each toward that side of the bait corresponding to its point of attachment at its port 3. As shown in Figures 3 and 4 the slide 4 inclines to the left on the upper half shell 1, and to the right on the lower half shell 2. A short line stem 6, having an eye 7 for attaching the fish line 8, is slidingly mounted through the head hole 5, and its inner end is formed into a loop 9, upon which are pivotally mounted the shanks 10 of the two oppositely turned fish hooks 11. The barbs 12 of these hooks are adjusted to pass in and out through the ports 3 in the operation of the device in a manner to be explained. At the point 13, where the two hooks cross each other when retracted inside the shells, one hook is provided on its side with a square shouldered notch 14, while the other has a small complementary catch 15 adapted to fit laterally into the notch 14 when the hooks are closed inside the bait. The hooks are so set and sprung toward each other, that when they are withdrawn inside the bait, they automatically lock together as stated, with the catch 15 within the notch 14. In use, the hooks are retracted within the shells, which prevents weeds or the like catching on the hooks. When a fish seizes this artificial minnow, the half shells are pressed together, or collapsed, thus forcing the barbs 12 apart as they move over the slides 4, and disengaging the catch 15 from the notch 14. At the same time the pull of the fish upon the line 8 forces the barbs 12 outwardly through the ports 3, and into the mouth of the fish.

While I have herein described a certain specific method of constructing and assembling the elements of my invention, it is understood that same may be varied in minor details, not departing from the spirit of my invention as defined in the appended claim.

I claim:

An artificial bait, comprising two half shells, together representing a minnow or the like, and adapted to collapse together on a longitudinal line, said shells being hingedly connected at their head ends and having a stem hole therethrough, and each half shell having a medial, oppositely positioned hook port; an inclined slide mounted interiorly at one side of each of the hook ports; the said slides being turned oppositely to each other; a short line stem slidingly mounted through the stem hole; two oppositely turned fish hooks inside the shells, same having their shanks pivotally connected to the inner end of the line stem and their barbs disposed at the slides at the hook ports, one hook having a notch and the other a complementary catch for releasably interlocking the hooks in their retracted position, the hooks being thus adapted to be forced out through the hook ports on compression of the half shells and strain upon the line stem.

ERNEST A. TRAVER.

Witnesses:
R. W. DRIGGS,
A. K. DOHLE.